Oct. 5, 1965    O. SCHWAB    3,209,618
TRANSMISSION GEAR FOR MOTOR VEHICLES
Original Filed April 23, 1959    2 Sheets-Sheet 1

Inventor:
OTTO SCHWAB
by Albertus Zalkind
ATT

Oct. 5, 1965    O. SCHWAB    3,209,618
TRANSMISSION GEAR FOR MOTOR VEHICLES
Original Filed April 23, 1959    2 Sheets-Sheet 2

United States Patent Office 3,209,618
Patented Oct. 5, 1965

3,209,618
TRANSMISSION GEAR FOR MOTOR VEHICLES
Otto Schwab, Friedrichshafen, Germany, assignor to Zahnradfabrik Friedrichshafen, Aktiengesellschaft, Friedrichshafen, Germany
Original application Apr. 23, 1959, Ser. No. 808,397. Divided and this application Jan. 11, 1963, Ser. No. 252,015
Claims priority, application Germany, Apr. 24, 1958, Z 6,619
11 Claims. (Cl. 74—688)

This invention relates to vehicle transmissions and more particularly to vehicle transmissions of the torque converter type as disclosed in prior copending application S.N. 808,397, now abandoned, filed April 23, 1959, with respect to which the present application is a division.

It is an object of the invention to provide a transmission which can be shifted automatically with smoothness of operation and without loss of tractive power.

It is another object of the invention to provide a transmission which will be simple to construct and economical to manufacture.

It is a further object of the invention to provide a transmission having shifting reaction torque elements for planetary gear sets and one-way engaging devices through which sufficient torque transmission engagement is effected at the time of greatest positive torque conversion of the torque converter.

It is a still further object of the invention to provide a torque conversion transmission having an adjustable speed by means of an arrangement of gears and means for adjusting the r.p.m. of the driving shaft relative the driven shaft in shifting.

An additional object of the invention is to provide an arrangement whereby, if desired, additional gear shift mechanism may be attached so as to increase the number of speeds possible with the basic mechanism.

A still further object of the invention is to provide for increased torque transmission for reverse speed.

All of the objects are attained in one or more of the embodiments of the invention as hereinbelow described.

Briefly, my invention comprises an automatic type of transmission wherein shifting is effected by means of oil or air pressure or any other suitable means. The general arrangement comprises a hydro-dynamic torque converter as a first stage coupled with a change speed planetary gear mechanism having constantly meshing gears. A particular feature of the arrangement resides in the utilization of reaction torque elements and one-way engaging devices for changing speeds via respective gear pairs. The converter is used as a single-circuit rotor; that is to say, the torsional input is positively geared as long as the speed of the turbine wheel is less than that of the impeller. However, when the turbine wheel reaches the speed of the impeller, torque conversion ceases. Under such conditions the converter operates as a fluid clutch. In time of starting, friction drive clutch means is utilized to effect torque transmission owing to a large slip in the converter at this time. Such friction drive clutch means, when used, during starting needs considerably more transmission surface than is required after the parts of the converter have come up to the same speed. The present invention has the unique feature that each stage of the change-speed gear in forward speed is equipped with two reaction torque elements, one such element being fixedly connected with the respective shaft while the other is connected to the shaft through the intermediary of a one-way engaging means. The first-mentioned element is used for shifting, while the vehicle is standing still or during subsequent speed change. The other element (110), however, is engaged only while the vehicle is standing still and is disengaged only after completed travel. The one-way means, in effect a freewheeling device, takes over the function of engaging and disengaging its torque element at individual stages of travel.

Another feature of the invention resides in the use of a hollow shaft to form the driving element of the change-gear mechanism in all stages of transmission, including reverse gear. This minimizes stress on the gear teeth.

The invention will now be described in detail in conjunction with the appended drawing in which all figures are schematic and diagrammatic, FIGS. 1 through 4 showing only one-half of the arrangement in each case, it being understood that the half, not shown, is identical with that which is shown, as follows.

Figure 1:
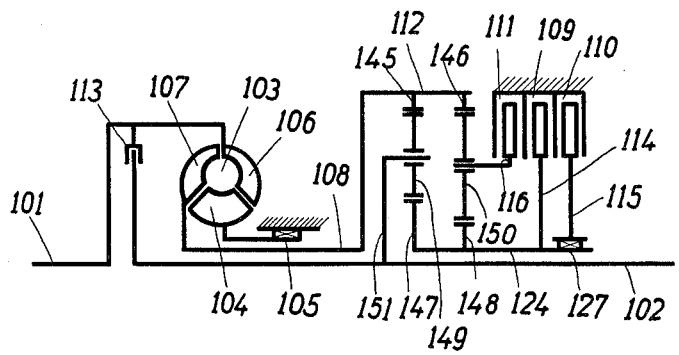
FIG. 1 shows a torque converter transmission with a two-speed planetary gear coupled in series therewith in which the converter is used in conjunction with a clutch in direct drive.

Referring now to FIG. 1, a drive shaft 101 is shown for the input while output is take off a driven shaft 102. A clutch 113 is provided between the driving and driven shaft; when the clutch is disengaged, shaft 101 drives impeller 106 of torque converter 103. So long as there is a difference in speeds between the impeller 106 and the turbine wheel 107 of the torque converter, and so long as the torsional input therefor is geared positively, the reaction vane wheel 104 is maintained stationary by means of the one-way device 105 attached to the transmission housing. Turbine 107 is carried on a hollow shaft 108, which shaft is rotatively mounted on the driven shaft 102, and is integral with a drum 112 to the interior of which is fastened ring gears 145 and 146 of two planetary gear systems. Thus, the ring gears are driven by turbine 107. In conjunction with ring gear 145 is a sun gear 147 carried on a hollow shaft 124 to which it is fixed. Similarly, ring gear 146 is associated with a sun gear 148 likewise carried on and fixed to hollow shaft 124. Hollow shaft 124 is rotatively mounted on driven shaft 102 and connects the two sun gears with frictional brakes 109 and 110. A friction disk 114 is provided for the releasable two-way brake 109, which disk is fixed to the hollow shaft 124, while releasable one-way brake 110 has friction disk 115 carried by means of a one-way engaging device 127 which is secured to the shaft 124. Between ring gear 145 and sun gear 147 planet pinions 149 are arranged on a spider 151 fixedly secured to the driven shaft 102. In a similar manner, planet pinions 150 are carried by a spider 116 intermediate the ring gear 146 and sun gear 148. The spider 116 also serves as a support for the brake disk for a brake 111, for reverse speed.

At the outset of torque transmission, the frictional brakes 109 and 110 are engaged, whereas clutch 113 remains disengaged. Accordingly, driven shaft 102 is operated by converter 103, hollow shaft 108, ring gear 145, and spider 151. This chain of transmission is effected because shaft 124 and thus sun gears 147 and 148 are restrained from rotation, the one-way device 127 being in locking position because of the starting resistance. Thus, both brakes 109 and 110 participate in power transmission at the outset. Upon sufficient acceleration of the vehicle, brake 109 may be opened and clutch 113 closed, thus coupling driven shaft 102 directly with drive shaft 101. At this time hollow shaft 124, via spider 151, commences to rotate and one-way device 127 releases brake disk 115 due to increase in speed. In shifting back, that is, upon opening clutch 113 and closing brake 109, shaft 101. At this time hollow shaft 124, via spider 151, transmission which rotates at an accelerated pace when the vehicle is traveling on a level stretch, so that shifting takes place smoothly and without any delay. During this operation, the one-way device 127 remains disengaged.

If, however, the vehicle meets resistance, such as in going up a grade, then one-way device 127 reacts against shaft 124 to bring into play both brakes 109 and 110 for effecting increased torque to the driven shaft 102.

For reverse speed, the brake 111 is provided, having a friction disk 116 integral with the spider of the second planetary gear arrangement 146, 148 and 150.

Figure 2:
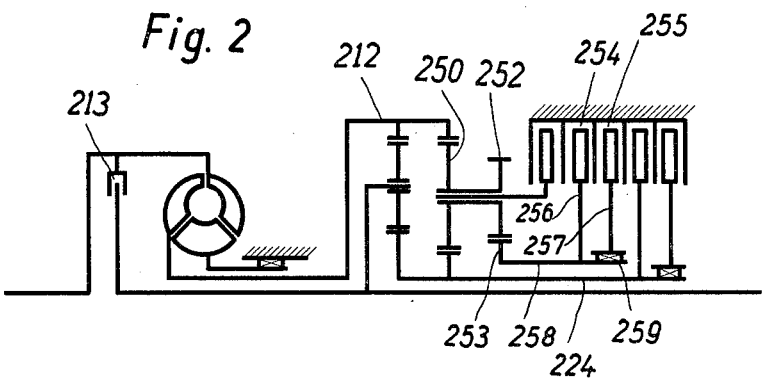
FIG. 2 is similar to FIG. 1 but shows a three-speed planetary gear.

Referring now to FIG. 2, the arrangement is similar to that shown in FIG. 1 except that the planetary gear is provided with two forward speeds. In order to effect this, a second hollow shaft 258 is carried on the first sun gear shaft 224 which shaft 258 carries an additional sun gear 253 meshed with a planetary gear 252. The planetary gear 252 is fixedly connected so that it rotates integrally with planetary gear 250 of the second set of planetary gears. Hollow shaft 258 can be slowed down by means of brakes 254 and 255. Brake 254 is fixedly connected with a hollow shaft 258 via a friction disk 256 while a friction disk 257, part of brake 255, reacts via the one-way device 259 against hollow shaft 258. Thus, it is possible to start with first or second gear. Otherwise, the mode of operation is the same as that shown in the arrangement of FIG. 1.

Figure 3:
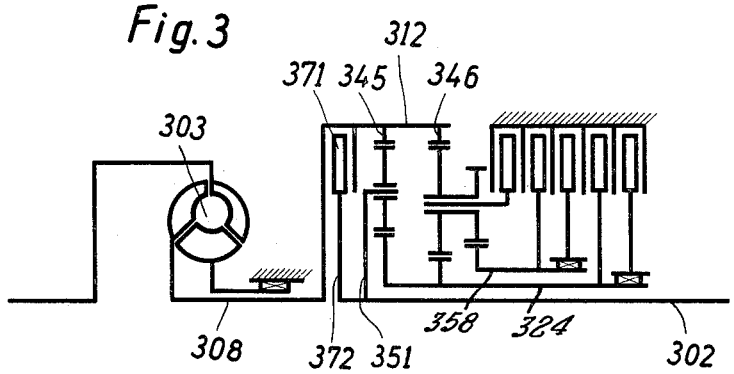
FIG. 3 shows a three-speed planetary gear arrangement as in FIG. 2, but without any clutch bridging the converter, direct drive thus being through the converter only.

Referring to FIG. 3, an arrangement somewhat similar to FIG. 2 is shown except that transmission in all speeds, including direct transmission, is effected by means of the torque converter 303. Accordingly, no clutch paralleling the torque converter has been provided. Instead, a clutch 371 is provided which has a driving disk 372 fixedly connected to the driven shaft 302. Driving disk 372 is disposed within a drum 312 which carries the ring gears 345 and 346. The mode of operation is the same as that heretofore set forth in connection with FIG. 2.

Figure 4:
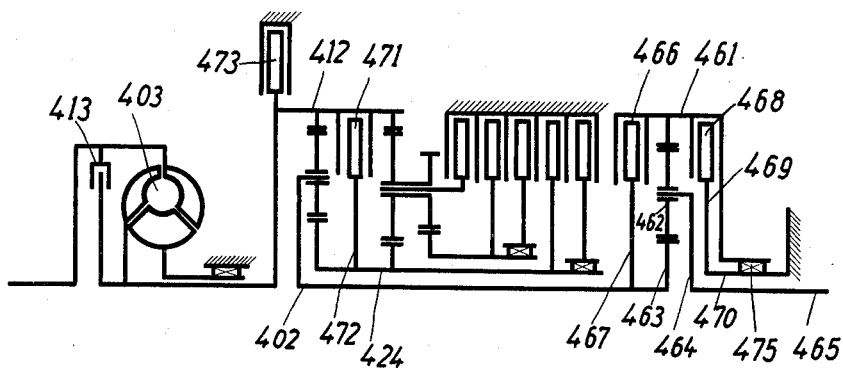
FIG. 4 shows a converter and change-speed gear arrangement having six forward speeds.

FIG. 4 shows an arrangement generally similar to FIG. 3 wherein a transmission stage in the form of a planetary gear is utilized, connected to a change speed gear for the purpose of doubling the number of speeds.

In order to effect smooth, uninterrupted, tractive force during shifting, a pair of friction brakes 466 and 468 are provided disposed within a drum 461 of an auxiliary transmission stage. In order to engage the latter stage, a brake 468 is provided having a driving disk 469 fixedly carried on the hollow shaft 470, which brake 468 is engaged, thus connecting driving disk 469 with the transmission housing via shaft 470, a sun gear 463 disposed on driven shaft 402 driving a planetary gear 462 which revolves within the drum 461 and drives a driven shaft 465 by means of the spider 464. Each time brake 468 is disengaged and brake 466 engaged, the driving disk of the latter effects rotation of the transmission as a block due to the fact that such driving disk is fixed on the driven shaft 402.

A one-way brake 475 is shown as disposed between hollow shaft 470 and the hub 474 of the hollow drum 461, which brake 475 prevents the drum 461 from rotating in the direction of the reaction torque effected due to disengagement of clutch 468.

The two brakes 466 and 468, when operated simultaneously, can also serve as brakes for the vehicle. In such case, the brakes are oil immersed to effect heat dissipation.

This form of the invention differs from FIG. 3 which uses a clutch for direct speed disposed on the driven shaft in the sense that a clutch 471 is provided within a hollow drum 412 on driving shaft 424, which is likewise hollow. The arrangement has the advantage of effecting small stress on the gear teeth. A clutch 413, paralleling the torque converter 403, is provided in this modification. A further advantage of the arrangement shown in FIG. 4 is that the hollow drum 412 may be provided with a frictional, hydraulic brake 473 which serves as a brake for the vehicle, as indicated on the drawing.

Having thus described my invention, I am aware that various changes may be made without departing from the spirit thereof, and accordingly I do not seek to be limited to the precise illustration herein given, except as set forth in the appended claims.

What is claimed is:

1. A variable speed transmission for vehicles comprising an input shaft, an output shaft, at least two planetary gear units each having an input element, an output element, and at least one reaction element, drive means operatively connected to the input shaft and directly connected to the input elements of said planetary gear units for simultaneous rotation thereof, a control shaft directly interconnecting the reaction element of one of the planetary units and output element of the other planetary gear unit, the output element of one of the planetary gear units being directly connected to the output shaft and drivingly engaged with the input and reaction elements, the reaction element of the other planetary gear unit being drivingly engaged with the input and output elements thereof, a multiple brake mechanism including a two-way brake device connected to each of said reaction elements for respectively conditioning said planetary gear units for transmission of power at a forward reduction drive ratio and a reverse drive ratio between the input and output shafts, releasable one-way brake means engageable with at least one of the reaction elements for transmission of relatively high torque at the forward reduction gear ratio when engaged simultaneously with one of the two-way brake devices and a relatively lower torque when engaged alone, and clutch means mounted by the input shaft and engageable with one of the elements of said one of the planetary gear units for direct drive between the input and output shafts.

2. The transmission defined in claim 1 wherein said drive means comprises a hydro-dynamic torque converter having an impeller connected to the input shaft and a driven turbine, and a drum member enclosing the planetary gear units and connected to said turbine, said input elements of said planetary gear units being fixedly mounted on the drum member.

3. The transmission defined in claim 2 wherein said multiple brake mechanism is mounted in axially spaced relation to the drum member, one of the two-way brake devices and releasable one-way brake means being mounted on the control shaft projecting axially from the drum member in coaxial relation to the output shaft.

4. The transmission defined in claim 3 wherein said other of the planetary gear units includes a second reaction element for conditioning the transmission for reverse drive and an intermediate forward reduction gear ratio, said second reaction element being connected to a separate two-way brake device and a releasable one-way brake means simultaneously engageable for transmission of high torque at the intermediate reduction gear ratio.

5. The transmission defined in claim 4 wherein the input elements of the planetary gear units are orbit gears enmeshed with separate sets of planet pinions, said sets of planet pinions respectively meshing with sun gears secured to the control shaft and constituting the interconnected reaction and output elements of the planetary gear units, the output element of said one of the planetary gear units rotatably mounting one set of the planet pinions while the reaction element of the other of said planetary gear units rotatably mounts the other set of planet pinions.

6. The transmission defined in claim 5 wherein the other set of planet pinions comprises compound gear elements meshing with the output element and said second reaction element.

7. The transmission defined in claim 1 wherein said drive means comprises a hydro-dynamic torque converter having an impeller connected to the input shaft and a driven turbine, and a drum member enclosing the planetary gear units and connected to said turbine, said input elements of said planetary gear units being fixedly mounted on the drum member.

8. The transmission defined in claim 7 wherein said multiple brake mechanism is mounted in axially spaced relation to the drum member, one of the two-way brake devices and releasable one-way brake means being mounted on the control shaft projecting axially from the drum member in coaxial relation to the output shaft.

9. The transmission defined in claim 1 wherein said other of the planetary gear units includes two reaction elements for respectively conditioning the transmission for reverse drive and an intermediate forward reduction gear ratio, one of said two reaction elements being connected to a separate two-way brake device and the releasable one-way brake means simultaneously engageable for transmission of high torque at the intermediate reduction gear ratio.

10. The transmission defined in claim 1 wherein the input elements of the planetary gear units are orbit gears enmeshed with separate sets of planet pinions, said sets of planet pinions respectively meshing with sun gears secured to the control shaft and constituting the interconnected reaction and output elements of the planetary gear units, the output element of said one of the planetary gear units rotatably mounting one set of the planet pinions while the reaction element of the other of said planetary gear units rotatably mounts the other set of planet pinions.

11. A variable speed transmission for vehicles comprising an input shaft, a hydrodynamic torque converter having an impeller connected to the input shaft and a driven turbine, at least two planetary gear units having interconnected input elements continuously driven by the turbine, said planetary gear units including separate sets of planet pinions meshing with said input elements, an output shaft drivingly connected to the set of planet pinions of one of said gear units, a control shaft coaxially mounted on said output shaft, interconnected gear elements secured to said control shaft in meshing relation with said sets of planet pinions, selectively braked carrier means rotatably mounting the set of planet pinions of the other of said gear units to condition both gear units for reverse drive between the input and output shafts, releasable one-way brake means engageable with the control shaft to condition only one of the planetary gear units for forward drive at a reduction gear ratio and direct drive when the hydrodynamic torque converter is in a coupling stage, clutch means mounted by the output shaft for producing direct drive between the input and output shafts and two-way brake means selectively engageable with the control shaft simultaneously with the one-way brake means to positively condition said one of the gear units at the reduction gear ratio when the hydrodynamic torque converter is in a torque multiplying stage.

References Cited by the Examiner
UNITED STATES PATENTS

| | | | |
|---|---|---|---|
| 1,256,373 | 2/18 | Rowledge | 74—761 |
| 2,518,824 | 8/50 | Simpson | 74—763 |
| 2,755,688 | 7/56 | Swennes | 74—688 |
| 2,856,794 | 10/58 | Simpson | 74—763 |
| 2,895,344 | 7/59 | Holdeman et al. | |
| 3,000,233 | 9/61 | Roche | 74—688 |

DON A. WAITE, *Primary Examiner.*